United States Patent [19]
Hadley et al.

[11] Patent Number: 5,995,714
[45] Date of Patent: Nov. 30, 1999

[54] METHOD FOR PRINTER CALIBRATION

[75] Inventors: Keith A. Hadley, Rochester; Kevin E. Spaulding, Spencerport, both of N.Y.

[73] Assignee: Eastman Kodak Company, Rochester, N.Y.

[21] Appl. No.: 08/602,409

[22] Filed: Feb. 16, 1996

[51] Int. Cl.⁶ .............................. H04N 1/46; G06F 15/00
[52] U.S. Cl. ........................................ 395/109; 358/504
[58] Field of Search ................................ 358/504, 501, 358/502, 526, 527; 395/103, 109

[56] References Cited

U.S. PATENT DOCUMENTS

| | | | |
|---|---|---|---|
| 5,053,866 | 10/1991 | Johnson | 358/75 |
| 5,298,993 | 3/1994 | Edgar et al. | 348/180 |
| 5,347,369 | 9/1994 | Harrington | 358/401 |
| 5,452,112 | 9/1995 | Wan et al. | 358/504 |
| 5,508,826 | 4/1996 | Lloyd | 358/501 |
| 5,604,567 | 2/1997 | Dundas | 355/326 R |

*Primary Examiner*—Jerome Grant, II
*Attorney, Agent, or Firm*—Raymond L. Owens

[57] ABSTRACT

A method is disclosed for calibrating a digital printer to provide a substantially aim printer response. A test target is processed through a set of potential calibration functions to form a set of processed test targets and the set of processed test targets is printed using the digital printer. Thereafter, the printer response for each of the potential calibration functions is evaluated by visually examining the printed set of processed test targets. The potential calibration function that best matches a visual criterion is then selected.

8 Claims, 7 Drawing Sheets

|  | x = -2 | x = -1 | x = 0 | x = 1 | x = 2 |
|---|---|---|---|---|---|
| y = 2 | R = -2.00<br>G = 2.73<br>B = -0.73 | R = -1.00<br>G = 2.23<br>B = -1.23 | R = 0.00<br>G = 1.73<br>B = -1.73 | R = 1.00<br>G = 1.23<br>B = -2.23 | R = 2.00<br>G = 0.73<br>B = -2.73 |
| y = 1 | R = -2.00<br>G = 1.87<br>B = 0.13 | R = -1.00<br>G = 1.37<br>B = -0.37 | R = 0.00<br>G = 0.87<br>B = -0.87 | R = 1.00<br>G = 0.37<br>B = -1.37 | R = 2.00<br>G = -0.13<br>B = -1.87 |
| y = 0 | R = -2.00<br>G = 1.00<br>B = 1.00 | R = -1.00<br>G = 0.50<br>B = 0.50 | R = 0.00<br>G = 0.00<br>B = 0.00 | R = 1.00<br>G = -0.50<br>B = -0.50 | R = 2.00<br>G = -1.00<br>B = -1.00 |
| y = -1 | R = -2.00<br>G = 0.13<br>B = 1.87 | R = -1.00<br>G = -0.37<br>B = 1.37 | R = 0.00<br>G = -0.87<br>B = 0.87 | R = 1.00<br>G = -1.37<br>B = 0.37 | R = 2.00<br>G = -1.87<br>B = -0.13 |
| y = -2 | R = -2.00<br>G = -0.73<br>B = 2.73 | R = -1.00<br>G = -1.23<br>B = 2.23 | R = 0.00<br>G = -1.73<br>B = 1.73 | R = 1.00<br>G = -2.23<br>B = 1.23 | R = 2.00<br>G = -2.73<br>B = 0.73 |

FIG. 7

METHOD FOR PRINTER CALIBRATION

CROSS REFERENCE TO RELATED APPLICATION

Reference is made to commonly assigned U.S. Provisional Patent Application No. 08/602,401 filed concurrently herewith, entitled "Method And Apparatus For Printer Calibration" by Hsue-Yang Liu et al, the disclosure of which is incorporated by reference.

FIELD OF THE INVENTION

This invention pertains to the field of digital image processing, and more particularly to the field of calibrating digital printing devices.

BACKGROUND OF THE INVENTION

A key component in many digital imaging systems is a digital printer. A digital printer produces hard copy output from a digital representation of an image. Digital printers have been made using many different basic technologies such as thermal dye-diffusion, electrophotography, ink-jet, and digital silver-halide writers. Such printers can either be monochrome (usually "black-and-white"), or may print multiple colors (typically cyan, magenta, and yellow). The input signal to a digital printer is a digitally encoded representation of the desired image. Typically, this includes a multi-level representation of the desired image density for each color plane at each x-y location (pixel) in the image. Alternatively, the information (such as a PostScript file) necessary to create such a representation can be supplied as input to the printer. Typically, each pixel may be characterized by an 8-bit digital value for each color plane in the image. These digital values are commonly referred to as code values. This provides $2^8=256$ possible density levels for the digital printer to reproduce.

A digital printer will typically respond to some fundamental control parameter. This control parameter will vary depending on the particular output technology. For example, thermal dye-diffusion printers typically respond to the number of heat pulses applied by a heater element for a given pixel, and silver halide printers typically respond to the digitally controlled intensity of a laser spot. The value of the control parameter will be referred to as the printer control signal. It is possible to measure the image density formed on a digital printer as a function of the value of the printer control signal. For example the optical density of the image as a function of the number of thermal pulses can be measured for a thermal dye-diffusion printer. This relationship between the physical output response of the digital printer and the printer control signal will be referred to as the "raw sensitometry" of the digital printer.

Usually the raw sensitometry for a digital printer does not correspond to the desired output density as a function of the input signal to the digital printer. As a result it is frequently necessary to apply a "printer calibration function" to convert the input signal to the appropriate printer control signal. For example, the printer calibration function may convert an 8-bit input signal into the number of thermal pulses necessary to produce the desired output density for each value of the input signal. This is illustrated in FIG. 1 which shows a digital printer responding to an input signal I(x,y) for each x, y pixel of the image. A calibration function 12 is applied to the input signal I(x,y) to produce a printer control signal P(x,y). Often the calibration function may be incorporated into the digital printer itself so that it is not apparent as a separate component to the user as is shown in FIG. 2. In this case, the digital printer 20 includes a digital print engine 22 as well as a printer calibration function 24. For a digital color printer, there will usually be three or four input color channels. Each color channel will typically have it's own calibration function. FIG. 3 shows a three color printer 30 having red, green, and blue input signals given by $I_R(x,y)$, $I_G(x,y)$, and $I_B(x,y)$, respectively. The calibration function for a red color channel 34 processes the red input signal $I_R(x,y)$ to form a red printer control signal $P_R(x,y)$. Likewise, the calibration functions for the other two channels (36 and 38) are used to process the corresponding input signals. The printer control signals are then used to drive a digital print engine 32.

Fundamental to being able to determine a printer calibration function is the accurate knowledge of the digital printer's raw sensitometry. As a result, printer manufacturers will typically go to great lengths to characterize and control the raw sensitometry of the digital printer as closely as possible in the manufacturing process. In many cases, however, the raw sensitometry of a printer will vary over time due to factors such as media variability, aging of the digital printer's components, and changes in the digital printer's environment. If the printer calibration function is not modified accordingly, the output density formed by the printer will also vary over time. This can manifest itself as a change in the overall density of the image, or in the case of a color printer, as a change in the color-balance of the image. This last effect can be particularly objectionable due to the fact that color balance errors are more easily perceived by a human observer than density errors. As a result it is frequently desirable to be able to measure the raw sensitometry of a printer in the field so that an updated calibration table can be produced and used in the printer.

A number of prior art methods of determining the raw sensitometry for a digital printer involve printing a calibration target having patches created using a series of different printer control signal values (see U.S. Pat. No. 5,053,866). The raw sensitometry can then be determined by measuring the output density (or some other output quantity) using a densitometer (or some other measurement instrument). Typically it is not necessary or desirable to measure the output density for every possible value of the printer control signal. More often, some subset of the printer control signals are used, and the raw sensitometry values for the remaining printer control signals can be estimated using interpolation and smoothing methods. One problem with this method however is that the measured raw sensitometry function is quite susceptible to errors introduced by measurement noise, density variability (both within a print, as well as print-to-print), and image artifacts. As a result, the resulting printer calibration table produced from the raw sensitometry will contain errors as well. These errors can be particularly objectionable for color printers because of the fact that errors in determining the raw sensitometry in one color plane can result in color balance errors which vary across the tone scale. For example, if you were to print a smooth neutral gradient spanning the range from black to white, some portions of the gradient might appear to have a greenish cast, while others might appear to have a reddish cast. This will be quite objectionable to a human observer.

Typically errors in the raw sensitometry measurements can be minimized by performing many replications of the measurements, and subsequently applying statistical techniques to eliminate bad data points, and average out the measurement errors. Although this is useful in the determination of the calibration function during the printer manufacturing process, it is frequently not convenient to do this when updating the printer calibration in the field where it is desired to make the fewest number of prints and measurements, and to complete the calibration procedure in the shortest possible time.

Additionally, access to a densitometer or some other measuring device is required when using instrumented calibration techniques. Many times these devices may not be available when performing calibration of the printer in the field. A number of techniques have recently been disclosed (see U.S. Pat. Nos. 5,298,993 and 5,347,369) which teach the use of calibration targets that can be "measured" using only a human observer. These techniques, which will be referred to as "visual calibration techniques," also tend to be susceptible to noise in the visual judgment process. In fact, since the measurement variability tends to be larger in many cases, the errors can actually be substantially larger than those associated with instrumented measurements.

SUMMARY OF THE INVENTION

It is an object of this invention to provide a method for determining the raw sensitometry of a digital printer which does not require any measurement devices, and is less susceptible to measurement error than the prior art methods discussed above.

This object is achieved in a method for calibrating a digital printer to provide a substantially aim printer response, comprising the steps of:

a) processing a test target through a set of potential calibration functions to form a set of processed test targets;

b) printing the set of processed test targets using the digital printer;

c) evaluating the printer response for each of the potential calibration functions by visually examining the printed set of processed test targets; and d) selecting the potential calibration function that best matches a visual criterion.

ADVANTAGES

The present invention has the advantage that it is simpler and less sensitive to noise and measurement error than instrumented techniques for determining the calibration function for a digital printer.

The present invention has the advantage over other visual calibration techniques that it is insensitive to observer errors made at one or more of the density levels by allowing the observer only a single selection for the entire tonal range.

It has the additional advantage over other visual calibration techniques that it requires very little knowledge of color science by not forcing the observer to choose from a color-specific slider control or adjustment knob.

BRIEF DESCRIPTION OF THE DRAWINGS

FIG. 7 depicts a sample set of speed shift values;

DETAILED DESCRIPTION OF THE INVENTION

This invention includes a new visual calibration technique for color printers that does not rely on the observer to make judgments at a series of different output density levels to construct the printer's raw sensitometry function. Instead, the existing smooth raw sensitometry function that was determined in the factory is perturbed by various amounts to form a set of candidate raw sensitometry functions. A target containing one or more gray levels is then processed using each of the candidate raw sensitometry functions, and an image is printed with a composite of the targets. An observer will then evaluate the targets to select the one that has the most acceptable tone response and color-balance over all the gray levels. This method has the advantage that any observer judgment errors at one or more of the individual gray levels do not create local errors in the raw sensitometry function that can result in the particularly objectionable variations in the color balance as a function of density level.

Figure 1:
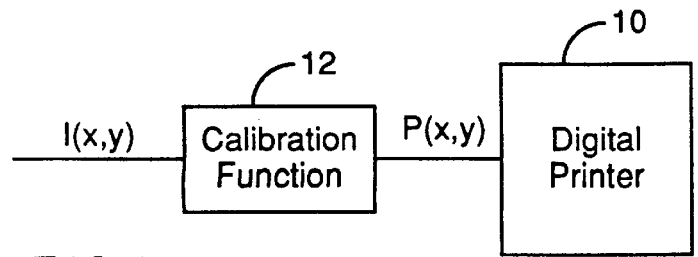
FIG. 1 shows a prior art printer calibration arrangement.
Figure 2:
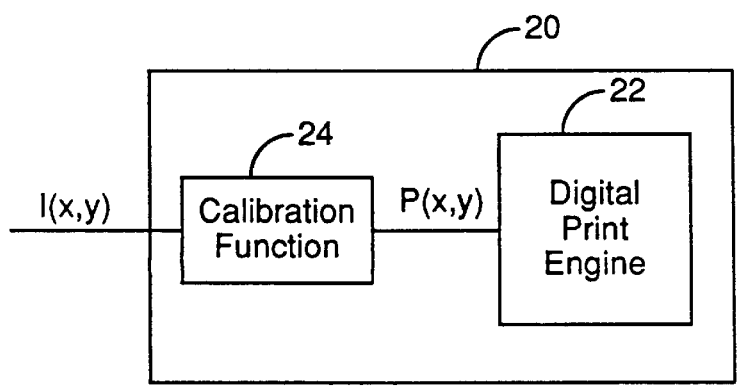
FIG. 2 shows a prior art printer calibration arrangement where the calibration function is integrated into a digital printer.
Figure 3:
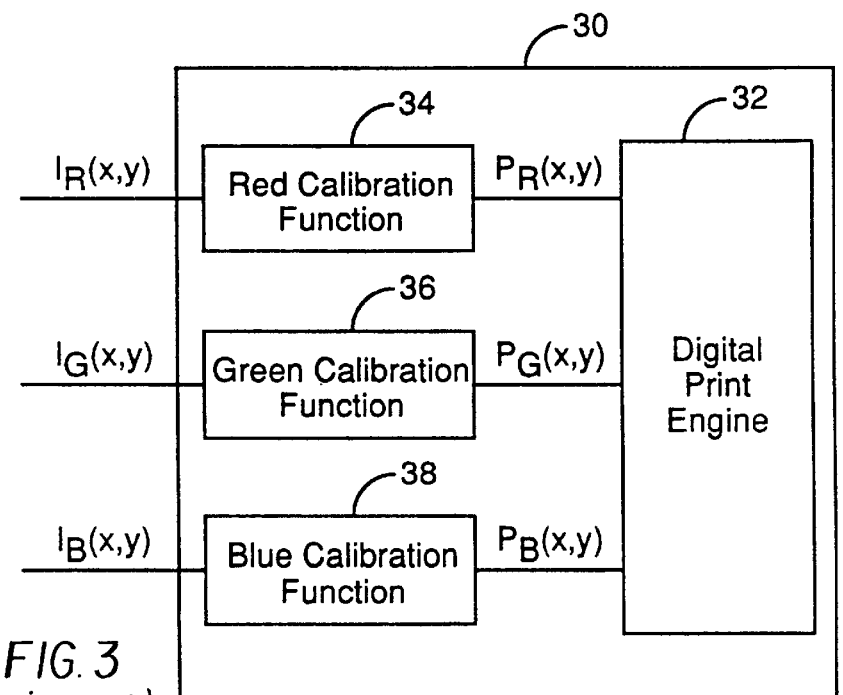
FIG. 3 shows a prior art printer calibration arrangement for a color printer.
Figure 4:
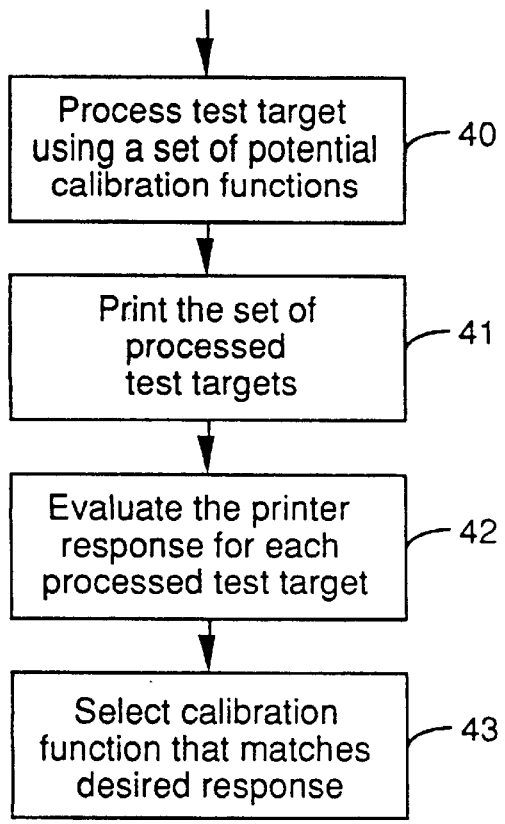
FIG. 4 is a logic diagram showing a method according to the present invention.

Turning to FIG. 4, a flow chart is shown describing the basic steps of the present invention. In the first step 40, a test target is processed using a set of potential calibration functions. The next step 41 includes printing the set of processed test targets. The set of printed test targets are then viewed in step 42 to evaluate the printer response for each of the potential calibration functions. In step 43, the potential calibration function having the most favorable response is then selected to be used as the printer calibration function for future prints.

Figure 5:
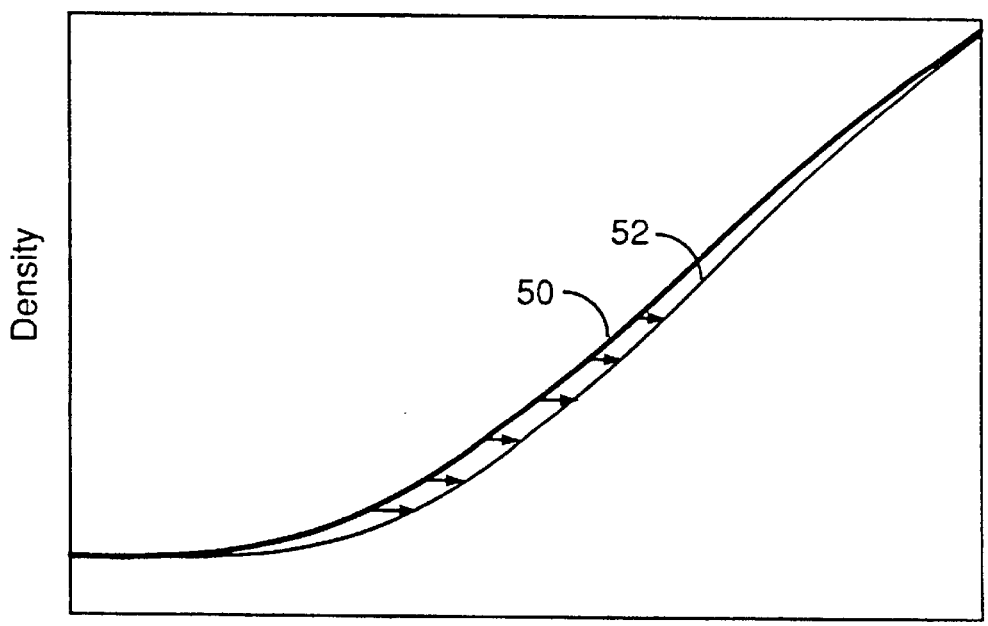
FIG. 5 depicts an example of a speed shifted raw sensitometry function.
Figure 6:
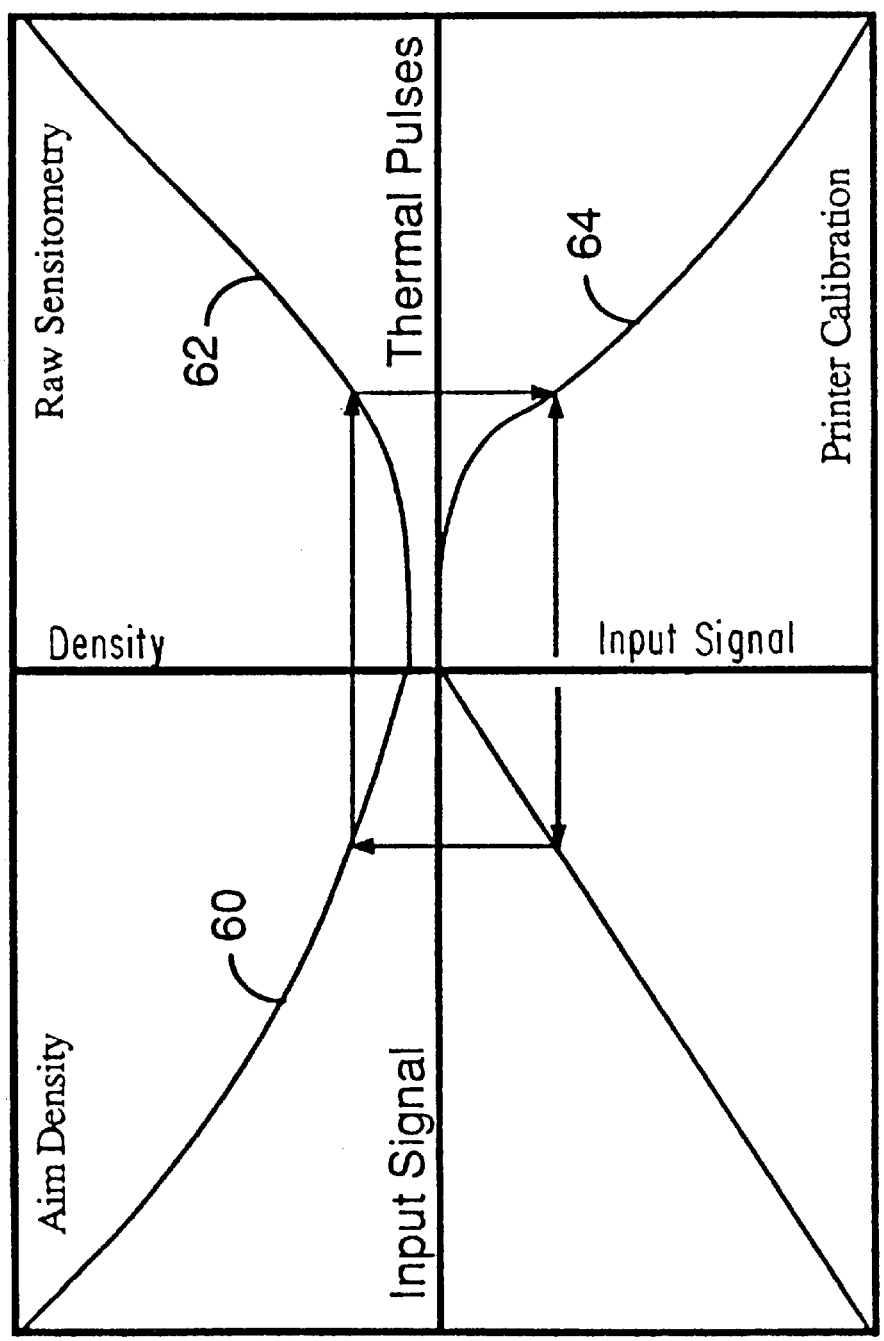
FIG. 6 illustrates a process for forming a calibration function from a raw sensitometry function and a aim printer response function.

The set of potential calibration functions used in step 40 may be a set of predetermined calibration functions representing known or likely variations in the printer calibration. Great care can be taken in the design of the predetermined calibration functions to ensure that they are smooth so that there will be a minimal opportunity for the introduction of artifacts such as contouring and local color balance variations. Alternatively, the set of potential calibration functions may be determined by applying modifications to a standard calibration function. For example, in the case of a thermal dye diffusion printer it has been found that the variations in the printer calibration table can typically be approximated by applying a density dependent shift to a standard raw sensitometry function. This fact was utilized in the design of the visual calibration technique described in this invention. The density dependent shift of the standard raw sensitometry function will be referred to as a "speed shift." FIG. 5 illustrates a typical standard raw sensitometry function 50, and a speed shifted raw sensitometry function 52. The difference between the two raw sensitometry functions can be adjusted by applying shifts of different magnitudes. Frequently, a single number can be used to represent the magnitude of the shift, although a weighting function may be used to vary the amount of shift applied as a function of density. The corresponding calibration function can be found by combining the speed shifted raw sensitometry with a aim printer response function 60 as shown in FIG. 6. By the term "aim printer response" is meant the desired printer response. For each input signal value, the desired output response (density in this example) is determined using the aim printer response function 60. The corresponding printer control signal (thermal pulses in this example) necessary to produce the desired output response is then determined using the raw sensitometry function 62. This composite function relating the input signal value to the printer control signal is the calibration function 64.

For a color printer, modifications to the calibration functions for each of the color channels can be made independently. Many times, the most important reason to recalibrate a printer is because of perceived color balance errors, rather than absolute density errors. In this case, the absolute response of any one color channel is less important than the relative response between the color channels. Therefore it is convenient to form a set of potential calibration functions which span the range of possible color balance variations. The speed shift technique is particularly convenient for forming such a set of potential calibration functions. For example, a set of calibration functions that are determined using speed shifted raw sensitometry functions using red, green and blue speed shifts given by R, G, and B, respectively, using the following equations:

$$R = k\rho \cos(\theta) \quad (1a)$$

$$G = -k\rho \cos(\theta + \pi/3) \quad (1b)$$

$$B = -k\rho \cos(\theta - \pi/3) \quad (1c)$$

where $$\rho = (x^2 + y^2)^{1/2} \quad (2a)$$

$$\theta = \tan^{-1}(y/x) \quad (2b)$$

FIG. 7 shows a set of speed shift values which were determined using equations (1) and (2) while x and y were varied between −2 and +2. The value of k in this case was taken to be 1.0. FIG. 7 reveals that the magnitude of the color balance shift grows with $\rho$ (the distance from the center point where x=y=0), and that the hue of the color balance shift varies with $\theta$ (the angle relative to the center point). It can be seen that such a set of potential calibration functions can be used to compensate for global color balance variations of different magnitudes and hues.

Figure 8:
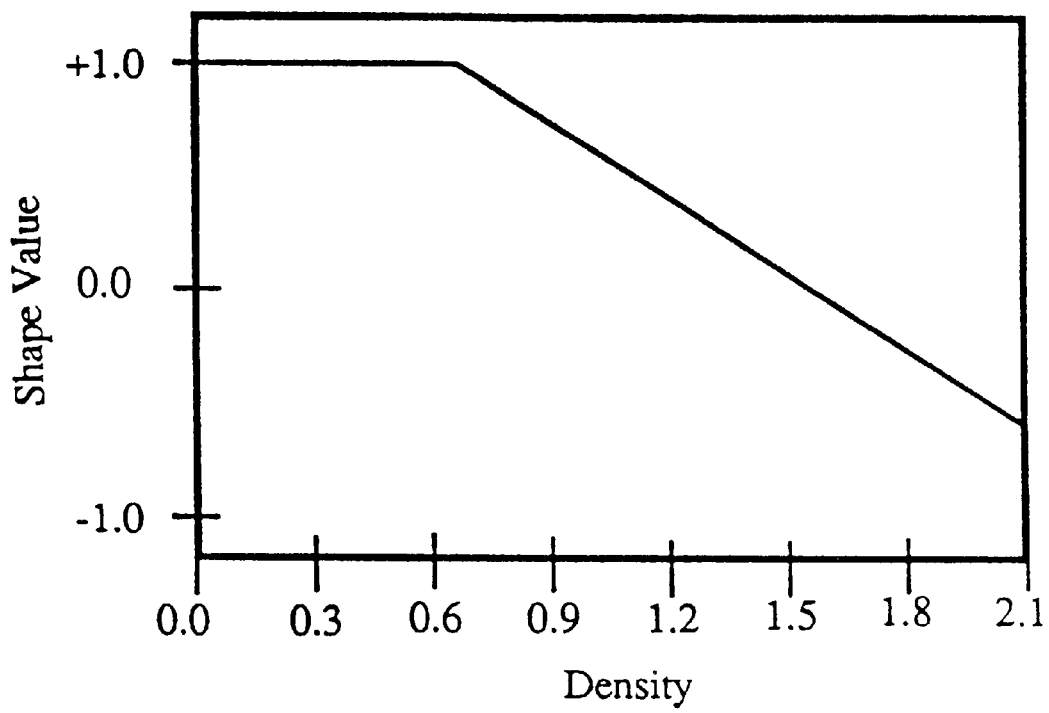
FIG. 8 depicts a shape table.

The process of creating a density dependent speed shift can be accomplished by applying a scaling factor to the shift values calculated with equations (1a)–(1c) as shown above. This scaling factor can be implemented in the form of a look-up table referred to as the shape table as shown in FIG. 8. Of course various shape tables could be used to emphasize the speed shift correction in any portion of the tonal range. FIG. 8 shows a shape table that is used to apply shift values with an emphasis in low density levels.

Once the set of potential calibration functions has been defined, it is then necessary to process a test target using each of the potential calibration functions as shown in step 40 of FIG. 4. In the preferred embodiment of this invention the test target will include one or more neutral patches having different density levels. Alternatively, color patches, or a combination of neutral and color patches could also be used. It is generally desirable to choose the patch values to be in regions of the tone scale which are most sensitive to the changes in the printer's response. The test targets can either be processed using the actual set of potential calibration functions and then printed using a null calibration function, or a set of equivalent calibration functions can be determined which would be equivalent to the desired set of potential calibration functions when cascaded with the current printer calibration function.

Figure 9:
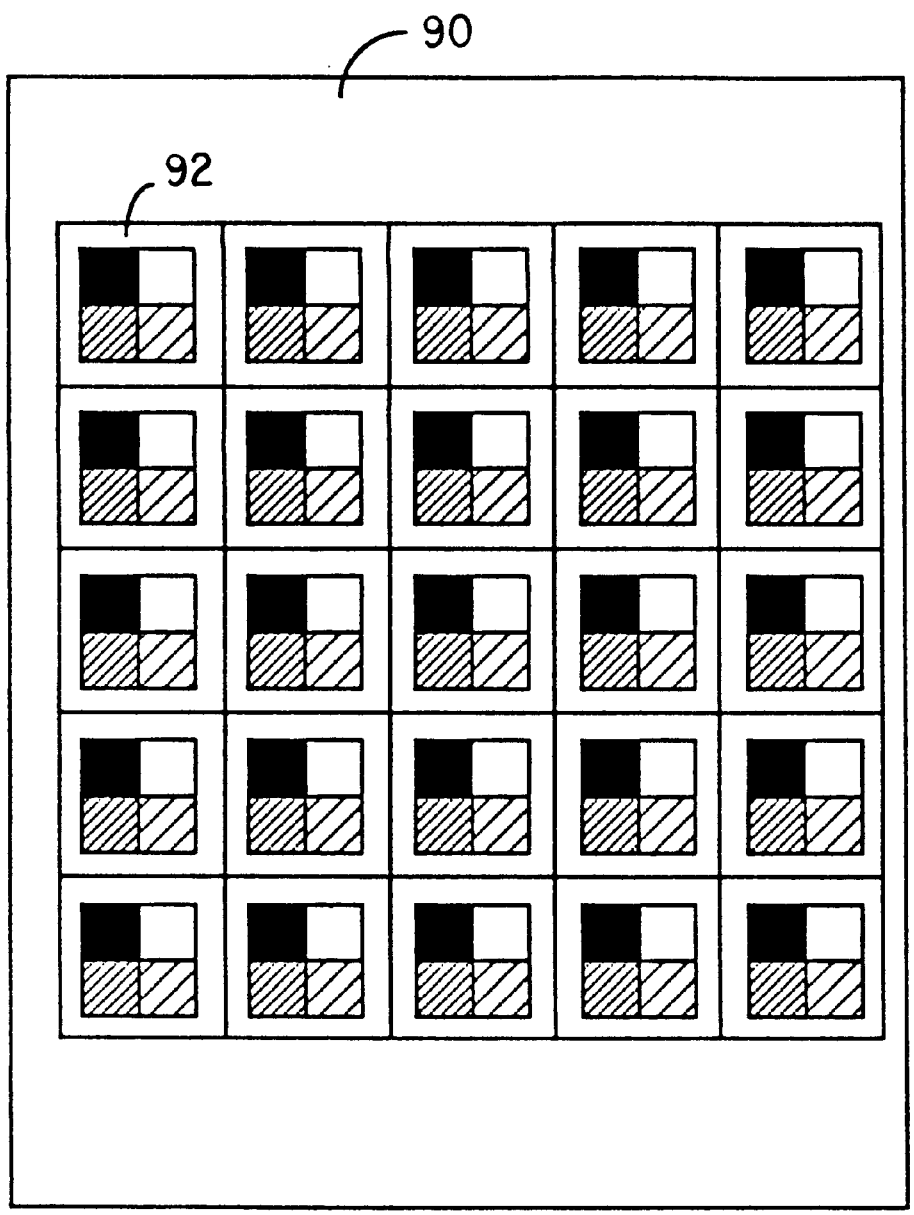
FIG. 9 depicts an image containing a set of test targets.

The next step is to print the processed test targets on the digital printer as shown in step 41 of FIG. 4. Each test target can be individually printed, or more conveniently, one or more composite images can be formed containing the set of processed test targets. FIG. 9 illustrates a composite image 90 that can be formed to print test targets processed using the set of speed shifts shown in FIG. 7. Each test target 92 corresponds to one of the potential calibration functions determined from the set of speed shift values. In this case it is convenient to arrange the test targets in rows and columns corresponding to the rows and columns of the array shown in FIG. 7, but this is by no means necessary. If the test targets were processed with the actual set of calibration functions, it is necessary to use a null printer calibration function, or bypass the printer calibration function altogether, during the printing process as was discussed above.

Once the processed test targets have been printed, it is then necessary to evaluate the printer response corresponding to each of the potential calibration functions as shown in step 42 of FIG. 4. In many cases, the aim printer response will correspond to a factory determined aim calibration. In other cases, it is desirable to allow an advanced user to specify a custom aim printer response for his specific tone reproduction and color balance preferences. For example, the user might prefer that neutral colors be reproduced with a "colder" color balance (i.e., more of a bluish color cast) than the factory determined aim calibration.

Figure 10:
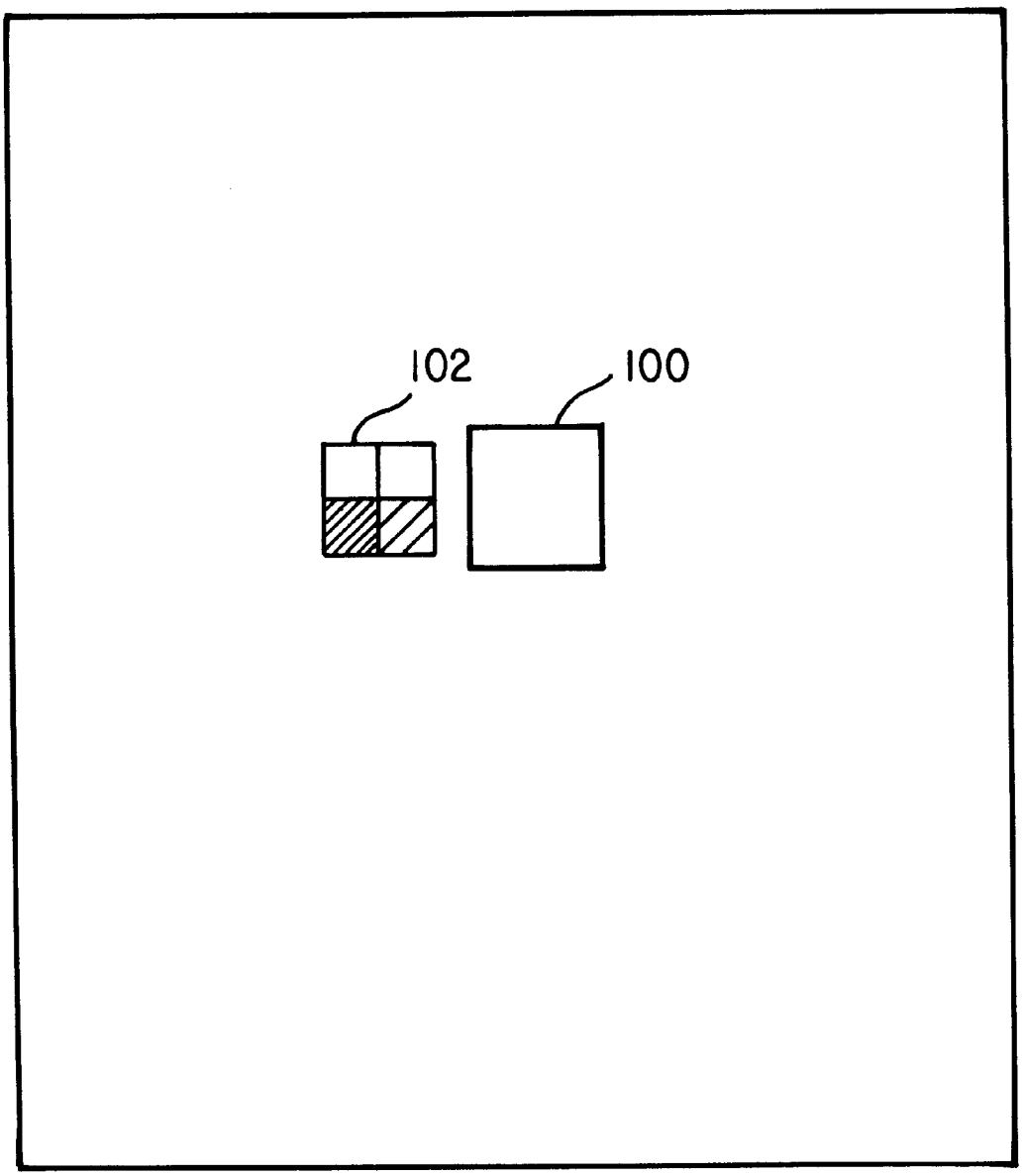
FIG. 10 depicts a reference test target.

To minimize observer variability it may be desirable in some cases to provide a reference test target for comparison with each of the set of printed test targets. An example reference test target is shown in FIG. 10. On the reference test target a set of test patches 102 is shown corresponding to an aim printer response. The reference test target may also be provided with a viewing window 100 that can be used to mask out a single one of the set of printed test targets.

After the printer response has been evaluated for each processed test target, it is necessary to select the calibration function that matches the desired response as shown in step 43 of FIG. 4. The selected calibration function can then be used with the printer until the next time the printer is calibrated. Depending on the architecture of the particular printer, it may be desirable and/or necessary to store the selected calibration function in a digital memory associated with the printer. In some cases, it may be desirable to store the calibration function on a host computer where it can be used to process image data being prepared for the printer, or downloaded with each job sent to the printer.

In some cases where the set of potential calibration functions vary in a systematic way, it may be possible to further refine the estimate of the proper calibration function. For example, consider the case where the speed shift technique is used to determine the set of potential calibration functions as was discussed above with reference to FIGS. 5–7. If the viewed printer response shows that one target has a greenish cast, and the adjoining target corresponding to the next speed shift increment has a magenta cast, then it is apparent that the appropriate value of the speed shift is between the two speed shift values used to process these targets. Based on this evaluation it is possible to perform a second iteration of the calibration procedure using finer speed shift increments to obtain a better estimate of the optimum speed shift value. The second iteration would use the speed shift values of the closest matching target from the first print as the speed shift values for the center target, and reduce the value of k in equations (1a)–(1c) in the calculation of the speed shift values to be used in the second print. The process of selecting the center speed shift values and reducing the range of speed shift values can of course be repeated any number of times until the desired output is reached. In practice, a two step process referred to as "coarse" and "fine" steps would most likely be sufficient.

Figure 11:
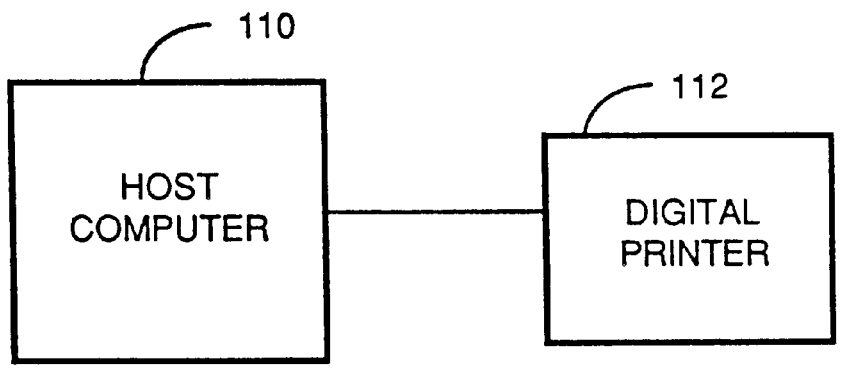
FIG. 11 depicts a digital imaging system used to implement the method of the present invention.

In another embodiment of the present invention the calibration process is accomplished using a host computer connected to the digital printer. An example of such a system is shown in FIG. 11. In such a system, the host computer 110 has the application software needed to carry out the step of processing the test target through the set of potential calibration functions. The digital printer 112 is then used to print the processed test targets. The digital printer itself could include necessary functions to execute this calibration process including an operator control panel at which the user would invoke the calibration, select fine or coarse speed shift increment, and enter the selection of the preferred target.

The invention has been described in detail with particular reference to the preferred embodiment thereof, but it will be understood that variations and modifications can be effected within the spirit and scope of the invention.

| Parts List | |
|---|---|
| 10 | digital printer |
| 12 | calibration function |
| 20 | digital printer |
| 22 | digital print engine |
| 24 | calibration function |
| 30 | three color printer |
| 32 | digital print engine |
| 34 | red calibration function |
| 36 | green calibration function |
| 38 | blue calibration function |
| 40 | test target processing step |
| 41 | test target printing step |
| 42 | test target viewing step |
| 43 | calibration function selection step |
| 50 | standard raw sensitometry function |
| 52 | speed shifted raw sensitometry function |
| 60 | aim printer response function |
| 62 | raw sensitometry function |
| 64 | calibration function |
| 90 | composite image |
| 92 | test target |
| 100 | viewing window |
| 102 | test patches |
| 110 | host computer |
| 112 | digital printer |

What is claimed is:

1. A method for calibrating a digital printer to provide a substantially aim printer response, comprising the steps of:
   a) processing a test target through a set of potential calibration functions to form a set of processed test targets;
   b) printing the set of processed test targets using the digital printer;
   c) evaluating the printer response for each of the potential calibration functions by visually examining the printed set of processed test targets; and
   d) selecting the potential calibration function that best matches a visual criterion;
      wherein the set of potential calibration functions are formed by applying modifications to a standard calibration function; and
      wherein the modifications to the standard calibration function are obtained by applying speed shifts to a standard raw sensitometry function.

2. The method of claim 1 wherein the test target includes one or more neutral patches.

3. The method of claim 2 wherein the visual criterion includes selecting the processed test target which produces neutral patches which are visually neutral.

4. The method of claim 3 wherein the visual selection process is aided by providing a reference target for comparison with the processed test targets.

5. The method of claim 1 wherein the set of processed test targets are printed as a composite image.

6. The method of claim 1 further including the step of loading the selected calibration function into the printer's memory.

7. The method of claim 1 further including the iterative process of centering the set of potential calibrations functions at the function which provides the closest match to the desired printer response, and reducing the range of potential calibration functions to be used with the next printed test target.

8. A method for calibrating a digital printer to provide a substantially aim printer response, comprising the steps of:
   a) forming a set of potential calibration functions by applying modifications to a standard calibration function;
   b) processing a test target through the set of potential calibration functions to form a set of processed test targets;
   c) printing the set of processed test targets using the digital printer;
   d) evaluating the printer response for each of the potential calibration functions by visually examining the printed set of processed test targets; and
   e) selecting the potential calibration function that best matches a visual criterion;
      wherein the modifications to the standard calibration function are obtained by applying speed shifts to a standard raw sensitometry function.

* * * * *